United States Patent [19]

Bouska et al.

[11] Patent Number: 5,203,090
[45] Date of Patent: Apr. 20, 1993

[54] SIDING LAYOUT TOOL AND METHOD

[76] Inventors: Bill R. Bouska, 105 Fourth Street, SE., West Union, Iowa 52175; Douglas L. Sevey, 635 Burbank Ave., Waterloo, Iowa 50702

[21] Appl. No.: 813,858

[22] Filed: Dec. 26, 1991

[51] Int. Cl.$^5$ ............................................... G01B 3/30
[52] U.S. Cl. ........................................ 33/481; 33/646; 33/42; 33/33
[58] Field of Search .................. 33/646, 647, 648, 649, 33/33, 41.1, 42, 429, 481

[56] References Cited

U.S. PATENT DOCUMENTS

| | | |
|---|---|---|
| 287,480 | 10/1883 | Smith . |
| 565,299 | 8/1896 | Ratcliff . |
| 631,315 | 8/1899 | Meskill . |
| 778,521 | 12/1904 | Wheat ........................... 33/42 |
| 810,246 | 1/1906 | Anderson ....................... 33/42 |
| 844,243 | 2/1907 | Breul ............................. 33/42 |
| 914,211 | 3/1909 | Whaley ......................... 33/481 |
| 921,488 | 5/1909 | Virtue ........................... 33/481 |
| 1,048,333 | 12/1912 | Mishler ......................... 33/481 |
| 1,115,202 | 10/1914 | Ingles . |
| 1,732,906 | 10/1929 | Morton ....................... 33/42 X |
| 4,879,818 | 11/1989 | Beaulieu . |

Primary Examiner—Harry N. Haroian
Attorney, Agent, or Firm—Andrus, Sceales, Starke & Sawall

[57] ABSTRACT

A tool and method for making a longitudinal mark on, or cut through, a piece of siding. The tool includes an upper plate portion and a lower plate portion, with a step therebetween, which is adapted to fit onto a piece of siding having an upper panel and a lower panel, with a ridge therebetween. The upper and lower plate portions each have a series of openings in predetermined locations along the length of the tool. The tool is used by engaging the step with the ridge of the piece of siding, such that the upper plate portion of the tool is located against the upper panel of the siding and the lower plate portion of the tool against the bottom panel of the siding. A pencil is placed through a selected one of the openings, and the tool and pencil are then moved along the siding while maintaining the step in engagement with the ridge. The ridge of the siding is thus used as a guide in making a longitudinal mark on the siding. Alternatively, the blade of a utility knife or the like can be placed through a selected one of the openings and through the siding, to make a longitudinal cut in the siding by moving the tool and the knife simultaneously along the siding.

8 Claims, 1 Drawing Sheet

U.S. Patent  Apr. 20, 1993  5,203,090
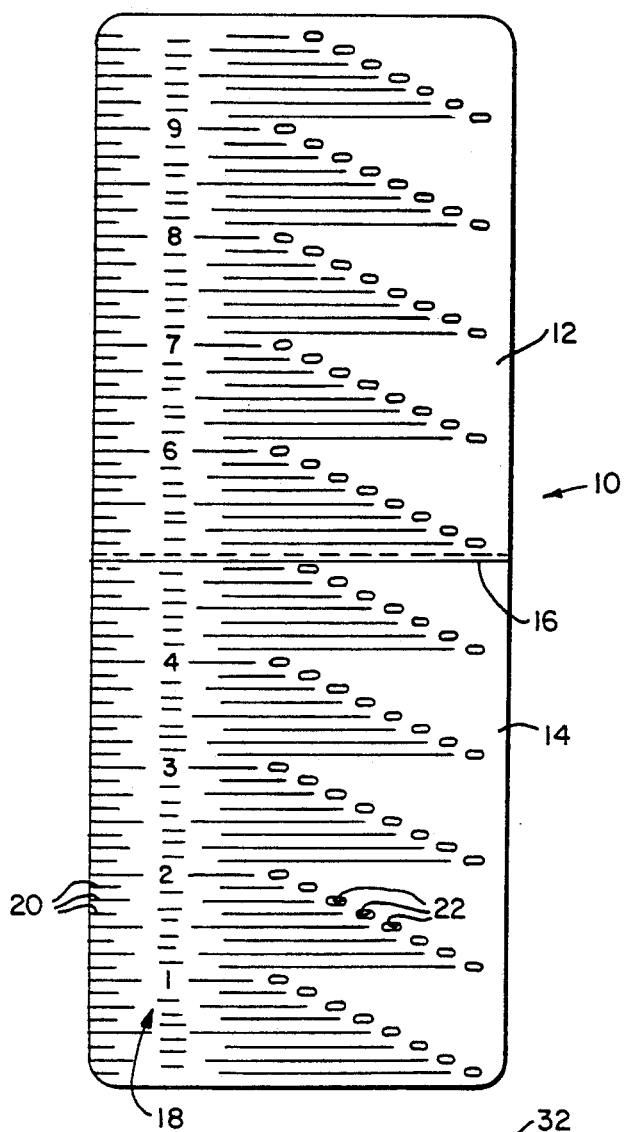
FIG. 1
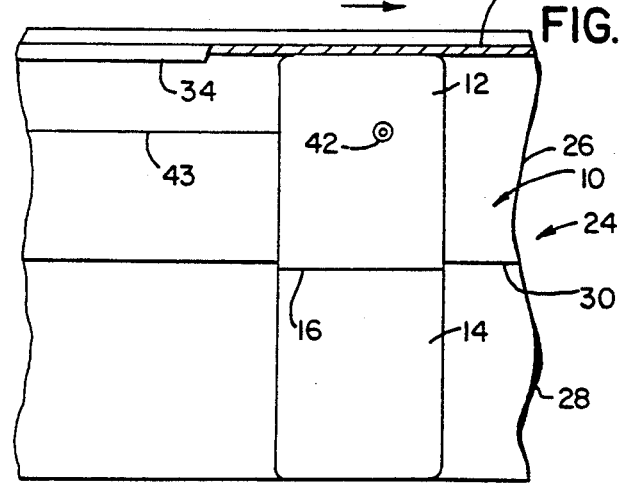
FIG. 3
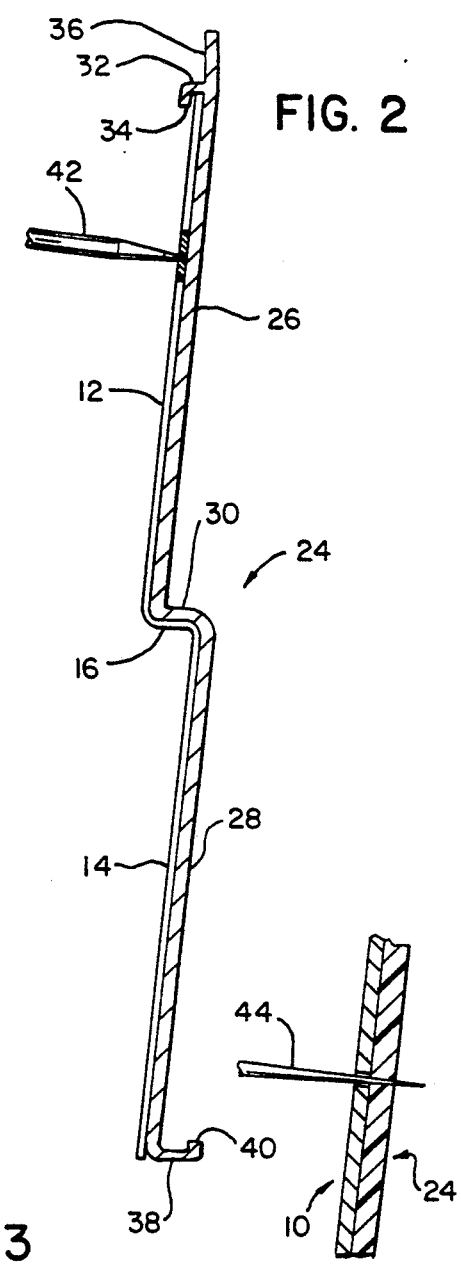
FIG. 2
FIG. 4
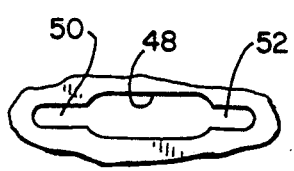
FIG. 5

SIDING LAYOUT TOOL AND METHOD

BACKGROUND AND SUMMARY

This invention relates to tools, and more particularly to a layout tool for use in marking and/or cutting of siding.

Siding, such as is used in residential building construction, generally includes an upper axially extending panel which terminates in a ridge or step at its lower end. A lower panel is located below the ridge. The lower panel has a step or ridge at its lower end, extending inwardly and terminating in an upturned lip. The upper panel includes an axially extending projection which terminates in a downturned lip. The siding is applied in courses, with the upturned lip at the lower end of the lower panel of a piece of siding engaging the downturned lip at the upper end of the upper panel of a piece of siding in the lower course, to engage the pieces of siding with each other. The piece of siding in the upper course is then fastened to a vertical panel, such as sheathing or an insulating board.

It is often necessary in the course of applying siding to the exterior wall of a building to longitudinally cut either the upper panel or the lower panel of the piece of siding. For instance, this is necessary when applying the siding around the top and bottom of a door or window, and at the top course of siding at the upper extent of the building wall. In the past, it has been known to apply marks on the piece of siding, using a tape measure or other measuring instrument, at the appropriate location on the upper or lower panel of the piece of siding. The marks are then connected using a straight edge and a marking instrument, such as a carpenter's pencil. A cutting instrument is then used to cut along the marked line. For vinyl siding, a utility knife may be used to cut along the line, whereas a pair of snips may be used to cut aluminum siding.

The above-described process of making a longitudinal mark and cut in a piece of siding involves several steps which must be carried out one at a time. Such steps add to the amount of time required to apply the siding to the building. In cases where there are a large number of doors and windows, this can greatly add to the overall time required, and therefore the cost, for applying siding to the building.

It is an object of the present invention to simplify the number of steps required to make a longitudinal mark on, or cut through, a piece of siding. It is a further object of the invention to utilize the structure of the siding itself to provide a guide for making a longitudinal mark on, or cut through, the piece of siding. It is a still further object of the invention to provide a method of cutting or marking siding which decreases the amount of time required for performing such operations. Yet another object of the invention is to provide a tool for marking or cutting siding which is extremely simple in its construction and operation.

In accordance with one aspect of the invention, a tool for use in cutting or marking a piece of siding, which includes a longitudinal ridge, consists of a substantially planar plate portion having a step located at one of its ends and which is oriented at an angle to the plate portion. One or more openings extend through the plate portion, with each being located at a predetermined distance from the step. The step at the end of the plate portion is adapted for engagement with the ridge of the piece of siding. A marking or cutting instrument is placed through a selected one of the openings through the plate portion when the step is engagable with the ridge of the piece of siding. The piece of siding can then be marked or cut by simultaneously moving the tool and the marking or cutting instrument longitudinally along the piece of siding while maintaining the step in engagement with the ridge. The tool preferably includes an upper plate portion located above the step, and a lower plate portion located below the step. The upper and lower plate portions and the step cooperate to define a cross-section corresponding to the outer surface defined by the upper and lower panels and the ridge of the piece of siding. The upper and lower plate portions each preferably include a series of vertically spaced openings, and the outer surface of the upper and lower plate portions is provided with indicia for indicating the location of each opening on the tool, and therefore the location of each opening on the piece of siding when the tool is placed thereon. In a preferred form, the openings are divided in to a series of subsets, with each opening in the subset being laterally offset from the adjacent openings.

In accordance with another aspect of the invention, a method of making a longitudinal mark on a piece of siding involves providing a tool defining a substantially planar plate portion and a step oriented at an angle to the plate portion. The plate portion has one or more openings extending therethrough, with each opening being located at a predetermined distance from the step. The tool is placed on the piece of siding such that the plate portion is disposed against the surface of the piece of siding, and the step is engaged with the longitudinal ridge of the piece of siding. A marking instrument is placed through a selected on of the openings in the plate portion, and the tool and marking instrument are simultaneously moved longitudinally along the piece of siding while maintaining the step in engagement with the longitudinal ridge. In a preferred form, the tool is constructed as summarized above, such that the step is located between upper and lower planar plate portions and is engagable with a central ridge provided in the piece of siding between the upper and lower panels.

The invention further contemplates a method of making a longitudinal cut through a piece of siding. This is accomplished by inserting a cutting instrument, such as the blade of a utility knife, through a selected one of the openings, and simultaneously moving the cutting instrument and the tool longitudinally along the piece of siding while maintaining the step in engagement with the longitudinal ridge of the piece of siding.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a front view of a tool for making a longitudinal mark on, or cut through, a piece of siding, constructed according to the invention;

FIG. 2 is a side elevation view showing the tool of FIG. 1 engaged against the outer surface of a piece of siding, shown in section;

FIG. 3 is a front view of the tool of FIGS. 1 and 2 placed on the outer surface of a piece of siding;

FIG. 4 is an enlarged partial section view showing the blade of a utility knife inserted through one of the openings in the tool of FIG. 1 and through the piece of siding; and FIG. 5 is a partial enlarged front view showing an individual one of the openings through the tool of FIG. 1.

DETAILED DESCRIPTION OF THE PREFERRED EMBODIMENT

Referring to FIG. 1, a layout tool 10 generally includes an upper planar plate portion 12, a lower planar plate portion 14, and a step 16 disposed between plate portions 12 and 14. Upper plate portion 12 and lower plate portion 14 lie in substantially parallel planes. Step 16 extends between and interconnects the lower end of upper plate portion 12 and the upper end of lower plate portion 14.

Referring to FIG. 2, step 16 cooperates with upper plate portion 12 and lower plate portion 14 to define angles of approximately 85°.

As shown in FIG. 1, tool 10 includes a vertical scale 18. Scale 18 commences with zero at the bottom edge of lower plate portion 14, increasing in an upward direction to the upper edge of upper plate portion 12. As shown in FIG. 1, scale 18 is graduated in inches, and ⅛th inch increments, such as shown at 20, are marked along the leftward edge of upper plate portion 12 and lower plate portion 14. As is shown in FIG. 1, lower plate portion 14 is approximately 5 inches in height, as is upper plate portion 12, for reasons to be explained.

A series of openings, such as shown at 22, extend through lower plate portion 14 and upper plate portion 12. Openings 22 are located such that their horizontal center lines are in locations corresponding to the ⅛th inch increments, such as shown at 20, provided along the vertical length of tool 10 (FIG. 1). Accordingly, openings 22 are offset ⅛th inch from each other in a direction along the vertical axis of tool 10. In addition, openings 22 are laterally offset from each other in a direction along the horizontal axis of tool 10. As shown in FIG. 1, openings 22 are grouped in subsets of eight, with one at each ⅛th inch increment 20, such that each subset of openings covers one inch along scale 18. That is, the lowermost group of openings 22 extends diagonally from the lower right corner of lower plate portion 14 upwardly and leftwardly, such that each opening is offset from the adjacent openings along both the vertical and horizontal axes of lower plate portion 14. This pattern is repeated for each inch along the length of scale 18, such that in total there are ten subsets of openings 22 on the outer face of tool 10 as defined by the outer surfaces of upper plate portion 12 and lower plate portion 14.

Openings 22 as shown in FIG. 1 are substantially oval in shape, having a width sufficient to receive both the lead of a pencil, such as a carpenter's pencil, and the tip of a utility knife or the like.

In use, tool 10 is adapted to be placed onto the outwardly facing surface of a piece of siding, such as shown generally at 24 (FIG. 2). Siding 24 is a typical piece of siding, such as vinyl siding or aluminum siding, and includes a 5 inch top panel 26 and a 5 inch bottom panel 28, with a longitudinal ridge 30 disposed therebetween. Ridge 30 runs in a longitudinal direction the full length of siding 24, between top panel 26 and bottom panel 28.

When tool 10 is in its FIG. 2 position, scale 18 and increments 20 act as a ruler for determining a vertical location on siding panels 26, 28.

An outwardly extending projection 32 is located at the upper end of top panel 26, with a downturned lip 34 located at the outer end of projection 32. Above projection 32, a nailing strip 36 extends along the length of siding 24, for use in fastening siding 24 to the exterior wall of a building.

An inwardly extending projection 38 is located at the bottom of bottom panel 28, and an upturned lip 40 is provided at the inner end of projection 38. In accordance with known construction, lip 40 is adapted to be engaged with the downturned lip, such as 34, of a lower piece of siding, to secure siding in adjacent courses together when attached to the exterior of a building.

Upper plate portion 12, lower plate portion 14 and step 16 of tool 10 define a cross-section corresponding to the outer surface of top panel 26, bottom panel 28 and ridge 30 of siding 24. In this manner, tool 10 is adapted to be placed onto the outer surface of siding 24 in a manner as is shown in FIG. 2, wherein step 16 engages the underside of ridge 30, upper plate portion 12 is placed against the outer surface of top panel 26, and lower plate portion 14 is placed against the outer surface of bottom panel 28. As shown in FIG. 2, the lower edge of lower plate portion 14 is coextensive with the lowermost edge of siding bottom panel 28. In this manner, the zero point of scale 18 corresponds to the bottom of siding 24, and scale 18 provides a measurement along the height of siding 24. Accordingly, when step 16 is engaged with ridge 30, each of openings 22 is located in a predetermined vertical position on siding panels 26 and 28. In addition, the upper end of upper plate portion 12 is located between the inwardly facing portion of downturned lip 34 and the outer surface of siding top panel 26.

To make a longitudinal mark on either top panel 26 or bottom panel 28 of siding 24, the user first positions tool 10 in the manner as shown in FIG. 2, in which step 16 is engaged with the underside of ridge 30 and upper and lower plate portions 12, 14 are positioned against the outer surfaces of top and bottom panels 26, 28 respectively of siding 24. The user then inserts the lead of a carpenter's pencil 42, or other satisfactory marking instrument, through the desired one of openings 22. To determine which of openings 22 is to be used, the user first measures on the building the height of siding 24 required for the longitudinal cut required, and then employs scale 18 to determine which of openings 22 is to be used. Once tool 10 and pencil 42 are in this position, as shown in FIG. 2, tool 10 is slid along the outer surface of siding 24 while maintaining step 16 in engagement with ridge 30 by exerting an upward force on tool 10, with the tip of pencil 42 remaining against the outer surface of siding 24. This step is illustrated in FIG. 3. This results in a longitudinal mark 43 being placed on siding 24 at a desired elevation above the bottom of siding 24, using ridge 30 as a guide to maintain tool 10 in a constant predetermined position on siding 24 as it is being moved along its outer surface. The user can then use a pair of snips to make the appropriate cut along the mark, if the siding is aluminum, or a utility knife if the siding is vinyl.

Alternatively, the user can forego making the mark on the siding, and instead insert the blade 44 of a utility knife through a desired one of openings 22, and also through siding 24 if its material of construction permits, such as if siding 24 is made of a vinyl material. The user can then move tool 10 along siding 24 while maintaining blade 44 in its FIG. 4 position, to make a longitudinal cut at a desired position on siding 24. In this manner, it is unnecessary to first make a mark before making the longitudinal cut through the piece of siding.

The disposition of the upper edge of upper plate portion 12 between lip 24 and the outer surface of top panel 26 acts to retain the upper end of tool 10 in position on siding 24 as it is being moved along the outer surface thereof.

The vertical side edges of tool 10 can be used as straight edges for marking or cutting vertically along upper and lower panels 26, 28 of siding 24.

FIG. 5 illustrates an alternative, and preferred, form of construction for the openings through upper plate portion 12 and lower plate portion 14 of tool 10. In this construction, the openings, one of which is illustrated representatively at 48, provide a pair of spaced parallel straight edges with inwardly curved end portions. Slots 50 and 52 extend outwardly from the end portions of each opening 48. Illustratively, each opening 48 has a width of approximately ⅛th inch, and slots 50 and 52 have a width of approximately 1/16th inch and extend approximately 3/32nds of an inch outwardly from the curved ends of opening 48. Slots 50 and 52 thus cooperate to define an elongated area adapted to receive blade 44 of a utility knife without damaging the ends of openings 22. When a conventional carpenter's pencil is employed in openings 48, its lead engages the curved ends of openings 48 without entering slots 50 or 52, due to the thickness of the lead.

Tool 10 is preferably formed, using conventional techniques, from sheet stock using a stamping die which simultaneously cuts and deforms the sheet stock to its shape of FIG. 1 and its cross-section of FIG. 2 while punching the openings, such as 22 or 48, through the sheet stock to yield the final form of tool 10 as illustrated. Scale 18 and increments 20 and the horizontal lines extending between increments 20 and openings 22 or 48 are then silk screened onto the outer surfaces of upper plate portion 12 and lower plate portion 14.

The tool and method of the invention thus provide an accurate and time-saving way to mark or cut siding by eliminating certain steps which were previously required in performing such operations. Accordingly, a substantial amount of time can be saved in cutting siding at the job site as required to fit around windows, doors or the like.

It should be appreciated that either upper plate portion 12 or lower plate portion 14 could be employed alone, in combination with step 16, to accomplish the same results as described. This would be the case, for example, with siding having a single panel and a ridge. In addition, it should be appreciated that any axially extending part of the siding can be used to guide the tool as it is moved along the siding. For example, projection 38 at the lower end of bottom panel 28 could be used to guide tool 10 as illustrated, and may be the only guide for a single panel piece of siding. In addition, projection 32 at the upper end of top panel 26 could be used to guide the tool.

Various alternatives and embodiments are contemplated as being within the scope of the following claims particularly pointing out and distinctly claiming the subject matter regarded as the invention.

We claim:

1. A method of making a longitudinal mark or cut on a piece of siding having an upper panel, a lower panel, a longitudinal ridge between the upper and lower panels, and a lip located toward the upper end of the upper panel, comprising the steps of:

providing a tool defining a substantially planar plate portion and a step oriented at an angle to the plate portion, the plate portion having one or more openings extending therethrough, each opening being located at a predetermined distance from the step, wherein the tool defines a cross-section substantially corresponding to the cross-section of at least a portion of the piece of siding, and wherein the plate portion includes an upper planar plate portion extending upwardly from the step and terminating in an upper end, and a lower planar plate portion extending downwardly from the step, the upper and lower plate portions each having one or more openings therethrough located at predetermined distances from the step;

placing the tool on the piece of siding by engaging the step with the longitudinal ridge disposed between the siding upper panel and the lower panel and placing the upper end of the upper planar plate portion between the lip and the upper panel to maintain the tool in position on the piece of siding, wherein the upper plate portion of the tool is disposed against the upper panel and the lower plate portion of the tool is disposed against the lower panel;

placing a marking or cutting instrument through a selected one of the openings in the plate portion; and simultaneously moving the tool and the marking or cutting instrument longitudinally along the piece of siding while maintaining the step in engagement with the longitudinal ridge of the piece of siding and while maintaining the upper end of the upper planar plate portion between the lip and the upper panel.

2. The method of claim 1, wherein the tool extends along a longitudinal tool axis and wherein the one or more openings comprise a plurality of spaced openings each located at a predetermined distance from the step along the longitudinal tool axis.

3. The method of claim 1, wherein the tool includes indicia for each opening for indicating the location of the opening relative to the step, and wherein the step of placing the marking instrument through a selected one of the openings includes determining the appropriate opening by utilizing the indicia.

4. The method of claim 1, wherein the longitudinal ridge defines a downwardly facing surface disposed between the upper and lower panels, and wherein the step of maintaining the step in engagement with the longitudinal ridge comprises exerting an upward force on the tool to maintain the step in engagement with the downwardly facing surface defined by the ridge.

5. A tool for use in longitudinally cutting or marking a piece of siding having an upper panel, a lower panel, and a longitudinal ridge between the upper and lower panels, the tool being defined by structure consisting solely of:

a substantially planar upper plate portion;
a substantially planar lower plate portion;
a step located between the upper and lower plate portions and oriented at an angle to each plate portion; and one or more openings extending through each plate portion, each opening being located at a predetermined distance from the step;

wherein a marking or cutting instrument is adapted to be placed through a selected one of the openings, and wherein the step is adapted to be engaged with the ridge of the piece of siding and the upper plate portion disposed against the upper siding panel and the lower plate portion disposed against the lower siding panel, wherein engagement of the step with the ridge functions to maintain the tool in position on the piece of siding, whereby the piece of siding can be marked or cut by moving the tool longitudinally along the piece of siding while maintaining the step in engagement with the ridge.

6. The tool of claim 5, wherein the upper and lower plate portions of the tool extend along a longitudinal tool axis, and further comprising indicia disposed on the upper and lower plate portions for indicating the location of each opening on the piece of siding when the step is engaged with the longitudinal ridge of the piece of siding.

7. The tool of claim 5, wherein the lower plate portion extends substantially the full extent of the lower panel below the ridge, and wherein the upper plate portion extends substantially the full extent of the upper panel above the ridge.

8. The tool of claim 7, wherein the lowermost edge of the lower plate portion is located substantially at the lowermost point of the lower panel when the step is engaged with the ridge.

* * * * *